Figure 1:
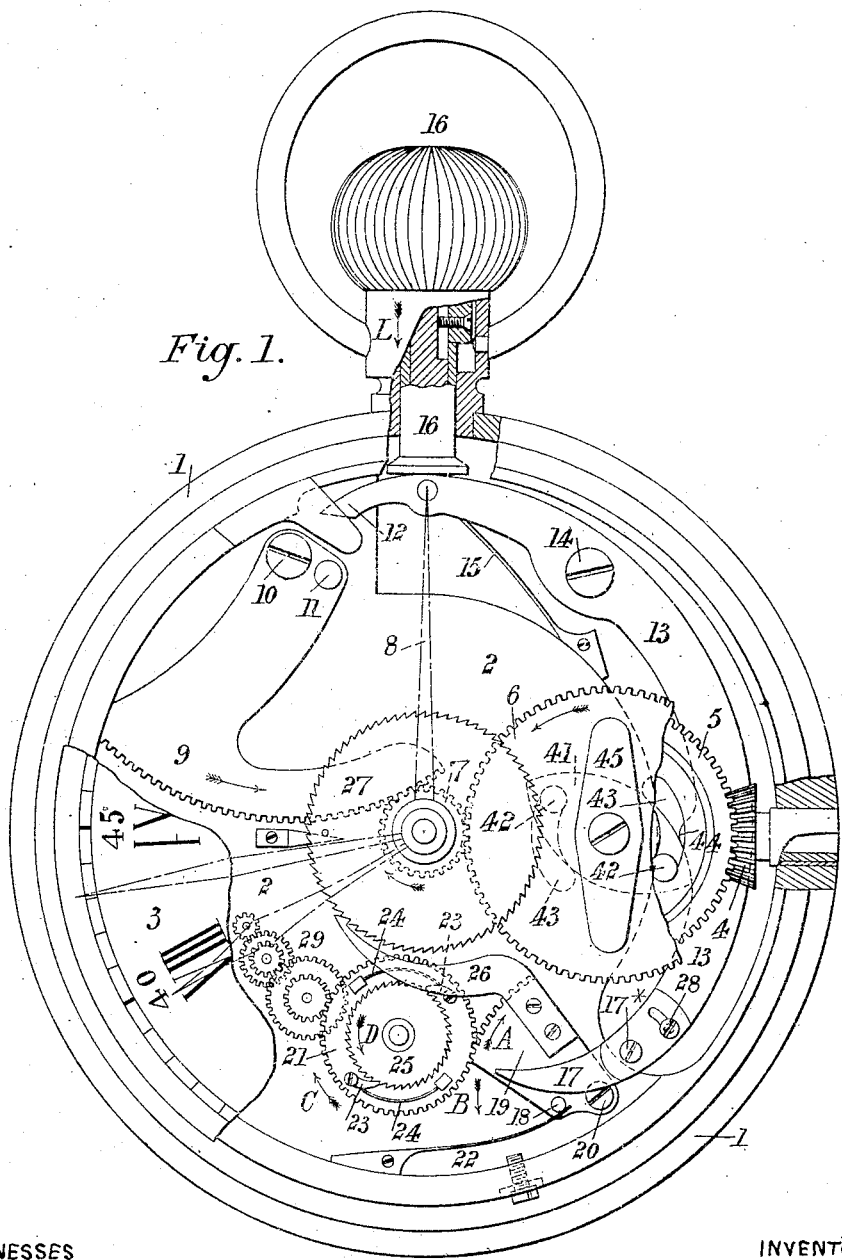

No. 850,745. PATENTED APR. 16, 1907.
T. W. FLORY.
SPEED INDICATOR.
APPLICATION FILED JAN. 4, 1906.

2 SHEETS—SHEET 1.

WITNESSES
Paul A. Blair
Walter Abbn

INVENTOR
Thomas Nass Flory
BY
Howson and Howson
ATTORNEYS

No. 850,745. PATENTED APR. 16, 1907.
T. W. FLORY.
SPEED INDICATOR.
APPLICATION FILED JAN. 4, 1906.

2 SHEETS—SHEET 2.

WITNESSES

INVENTOR
Thomas Wass Flory
BY

ATTORNEYS

UNITED STATES PATENT OFFICE.

THOMAS WASS FLORY, OF LONDON, ENGLAND.

SPEED-INDICATOR.

No. 850,745.      Specification of Letters Patent.      Patented April 16, 1907.

Application filed January 4, 1906. Serial No. 294,580.

*To all whom it may concern:*

Be it known that I, THOMAS WASS FLORY, a subject of the King of Great Britain and Ireland, residing at 108 Hatton Garden, in the city of London, England, engineer, have invented new and useful Improvements in Speed-Indicators, of which the following is a specification.

My invention relates to speed-indicators, and especially to those for indicating the speed of motor-cars, velocipedes, locomotives, and the like; but my said invention is applicable to speed-indicators for other purposes—such, for instance, as for indicating the speed of stationary engines.

The speed-indicators upon which the improvements according to my invention are based are those in which an indicating device, such as an index-finger or pointer, is driven from the object whose speed is to be indicated (one of the wheels of a motor-car, for example) for a predetermined period of time, and such speed-indicators have been provided with clockwork which is brought into action only at the same time as the index-finger or pointer, the movement of the said clockwork stopping as soon as it stops the movement of the index-finger or pointer after the lapse of the predetermined period of time; but I provide mechanism such that the clockwork continues in operation for indicating time or for other purpose whether the said index-finger or pointer be in operation or not, and therefore I combine in one device a speed-indicator and clockwork for indicating time or for other purpose requiring continuous movement.

According to my invention I employ clockwork with a dial and hands, as in a clock or watch, and in the same casing I employ gearing driven from the wheel or the like whose speed is to be indicated and actuating an indicating device, such as an index-finger or pointer, moving over a dial or ring marked with divisions to indicate speed, the said gear being provided with a frictional or equivalent device which when the wheel for driving the index-finger or pointer is free will convey motion from the rotating body to the index-finger or pointer, but which will not convey such motion when the said wheel is locked. I provide a device operated by a push-button or the like by which the said wheel is released and by which a sector or the equivalent is caused to turn back a wheel which by then being engaged with the clockwork or with a train of gear-wheels or equivalent retarding device will prevent for a predetermined time the locking of the wheel driving the index-finger or pointer, so that during that time the index-finger or pointer will be moved to an extent corresponding with the speed being measured and after the lapse of the predetermined time the said wheel will be again locked. The usual or any suitable device is used to bring the pointer back to zero.

I will describe, with reference to the accompanying drawings, constructions in accordance with my invention, premising that I do not limit myself to the precise details.

Figure 2:
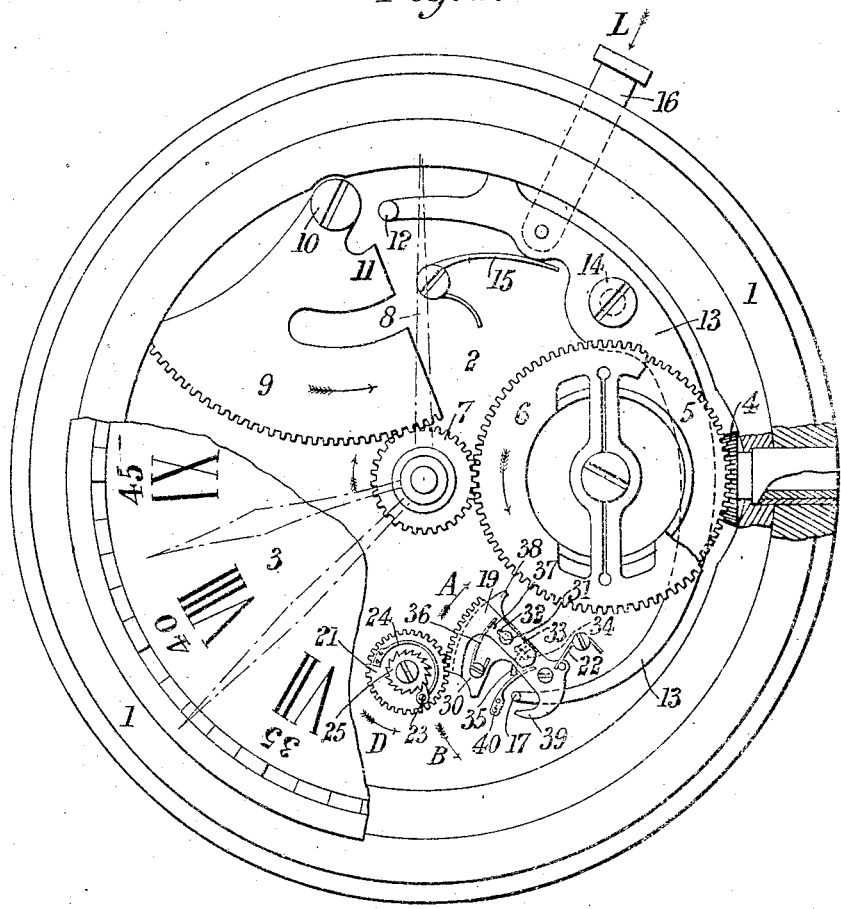

Figure 1 of the accompanying drawings shows, with part of the dial broken away, an arrangement according to my invention as applied, for example, to a speed-indicator for a motor-car, from which its use for other speed indicating will also be understood; and Fig. 2 is a modification, as hereinafter described.

1 is a case, (which may be similar to that of a watch or carriage-clock, for example,) and 2 is a plate in the said case, beneath which plate is arranged the clockwork. (Not shown in the drawings.)

3 is a dial which besides being marked with the hours and minutes is also provided with divisions indicating miles, kilometers, or other convenient units of distance.

4 is a pinion in the said case, driven continuously by a shaft or flexible rotating member, such as a flexible metal cable, rotated in any suitable manner by one of the wheels of the vehicle and provided with an end piece to be inserted in the squared recess in the axis of the said pinion 4. The said pinion 4 gears with a toothed bevel-wheel 5, frictionally held by a spring-plate 45 against a second toothed wheel 6, gearing with a pinion 7, the arbor of which carries the speed-indicating pointer 8. Through the hub of the last-named pinion 7 pass the arbor of the hour-hand and the socket carrying the minute-hand of the clock mechanism. The said pinion 7 gears with a toothed sector 9, pivoted at 10 to the aforesaid plate 2 and provided with a pin 11 or a shoulder with which a projection 12 can be brought into contact, the said projection 12 being at one end of a lever 13, pivoted at 14 and subjected to the action of a spring 15 and acted on by a push-pin 16, so that when the said lever 13 is operated by pressing the push-pin 16 in the direction of the arrow L a projection 17 on the other end of the lever 13 is caused to come into contact with a pin 18 on a second toothed sector 19, gearing with a toothed wheel 21, the said sector 19 being moved in the direction of the arrow A by a spring 22 pressing on the pin 18 on the said sector 19. The said toothed wheel 21 is mounted loosely on one of the arbors of the clockwork-wheels arranged below the aforesaid plate 2, but is connected to this arbor by spring-pawls 23 on springs 24 and engaging a second ratchet-wheel 25, fixed to the said arbor, so that the said toothed wheel 21 can be turned in either direction on the said arbor. The sector 19 carries a detent 26, which is caused to gear with a ratchet-wheel 27, fixed to or formed with the pinion 7, carrying the index-finger 8, with which pinion gears, as aforesaid, the first-named sector 9 and the wheel 6, which is in frictional contact with the wheel 5, driven by the pinion conveying motion from the vehicle-wheel. When the push-pin 16 is pressed in for the purpose of starting the indicating mechanism, the end 17 of the lever 13 by pressing on the pin 18 on the second sector 19 turns the said sector on its pivot 20 in the direction of the arrow B, so as to disengage the detent 26 from the ratchet-wheel 27 on the arbor of the index-finger and rotate the wheel 21, the pawls 23 riding over the teeth of the ratchet-wheel 25 to a greater or lesser extent, according to the extent of rotation given to the sector 19, and this extent of rotation can be regulated by adjusting the end 17 of the lever 13, for which purpose the said end 17 is made separate from the main portion of the lever 13 and is connected thereto by a center pin or screw 17 and slot-and-screw connection 28 or otherwise, so as to permit of the adjustment and fixing of the said end 17. When the pressure on the push-pin 16 is released, the sector 19, under the action of the spring 22, is returned to its former position, and the pawls 23 on the wheel 21 by their engagement with the teeth of the ratchet-wheel 25 impart auxiliary power to the clockwork.

When no speed indication is required, the detent 26, carried on the sector 19, is engaged with the ratchet-wheel 27 on the arbor of the index-finger and the ratchet-wheel 25 will be rotated by the clockwork in the direction of the arrow D, the ratchet-teeth riding over the pawls 23 and the wheel 21 being stationary. The pinion 4, driven as aforesaid, from one of the vehicle-wheels, simply rotates the wheel 5, which it drives, without this wheel causing the next wheel 6 to rotate, the index-finger remaining stationary at the point of the dial corresponding to the speed recorded in the last observation made with the indicator or at zero, as the case may be.

To ascertain the speed at which the vehicle is moving, the push-pin 16 is pressed in the direction of the arrow L, thereby causing the releasing-lever 13 to turn on its pivot 14 against the action of its spring 15, and the end 17 of the lever 13 will act on the pin 18 on the aforesaid second sector 19 so as to disengage the detent 26 from the teeth of the ratchet-wheel 27 on the arbor of the index-finger, while the projection 12 of the lever 13 by pressing on a pin 11 on the first-named sector 9 rotates, through the pinion 7, the said sector 9, thereby bringing the index-finger back to zero. The push-pin 16 being released, the second sector 19 being in gear with its wheel 21, and the detent 26, carried by the sector 19, being free of the wheel 27 on the arbor of the index-finger, the said wheel 27 is turned by the wheel 5 through the pinion 7 and actuates the index-finger 8 to indicate on the dial 3 the speed of the vehicle, the second sector 19 being turned by its spring 22 in the direction of the arrow A at a rate determined by the rate at which the clockwork drives the second ratchet-wheel 25 (which is now engaged by the pawls with the toothed wheel 21 engaged with the said second sector 19) until the detent 26 again engages the teeth of the ratchet-wheel 27 on the arbor of the index-finger, when the movement of the index-finger is arrested at a division on the dial which indicates the speed at which the vehicle is running, the divisions and the intermediate mechanism between the vehicle-wheel and the pinion 7 on the arbor of the index-finger being proportioned in accordance with the diameter of the vehicle-wheel and the time which the second sector 19 takes to accomplish its stroke in the direction of the arrow A.

As the toothed wheel 21, which in indicating becomes engaged with the second ratchet-wheel, is loose on the arbor of the said ratchet-wheel 25, the said toothed wheel 21 can rotate independently of the ratchet-wheel 25 in the direction opposite to that in which it turns while the index-finger is moving to indicate speed, and therefore if by inadvertence the push-pin 16 should be pushed inward while an indication is being effected back pressure on the clockwork is prevented.

The speed-indicating mechanism may be used without the time-indicating mechanism or the necessity for any spring-barrel by gearing the toothed wheel 21 with a train of wheels 29 or equivalent retarding device arranged to present sufficient resistance to retard the rotation of the said toothed wheel 21 and bring the detent 26 into engagement with the wheel 27 on the arbor of the index-finger after a certain lapse of time—say, for example, one minute—and thereby stop the index-finger at the division on the dial which will indicate the speed at which the vehicle is running.

In the modification illustrated in Fig. 2 the second sector 19, which gears with the wheel 21, is made in two parts, one part 19 carrying the teeth and being kept in contact with the other part 30 by a screw 31 passing through a radial slot 32 in the part 19 and screwing into the part 30, the part 19 being permitted to slide on the said screw 31. A pin 33 is fixed to the inner side and near the other end of the part 19 of the sector and passes through a radial slot 34 in the part 30 and bears against a curved projection 35 on the plate 2, the said pin 33 being pressed against the projection 35 by a spring 36, fixed to the part 30 of the sector and pressing against a pin 37 on the part 19 of the sector, so that when the parts 19 and 30 of the sector move in the direction of the arrow A and the pin 33 passes off the curved projection 35 the spring 36 moves the part 19 of the sector radially, so as to disengage the teeth thereon from the wheel 21, and at the same time a projection 38 on the part 30 of the sector engages between two teeth of the wheel 6, which drives the index-finger, and so stops its movement.

When by pressure on the push-pin 16 the projection 17 on the lower end of the releasing-lever 13 is caused to come into contact with the tail 39 of the part 30 of the sector, the sector as a whole (consisting of the parts 19 and 30) will be moved in the drection of the arrow B for releasing the speed-indicating gear, the part 19 of the sector being out of gear with its wheel 21, until the aforesaid pin 33, which is now at the back of the aforesaid projection 35, meets a spring 40 and leaves the said projection 35, whereupon the said spring 40 moves the part 19 of the sector into engagement with its wheel 21, so that the sector on its return movement under the action of its spring will rotate the said wheel 21 in the direction of the arrow D and at the rate at which the ratchet-wheel 25 is rotated by the clockwork until the nose 38 on the part 30 of the sector engages the teeth of the wheel 6, which drives the index-finger and stops the movement of the said index-finger 8, which then indicates on the dial the speed at which the vehicle is running.

The device for starting the clockwork may be other than the push-pin 16. For example, the index-finger may be started by the movement of the vehicle-wheel. In Fig. 1 is shown an arrangement for this purpose, which is as follows: On the shaft carrying the wheels 5 and 6 is loosely mounted in close proximity to wheel 5 a cam 41, having two studs 42 projecting therefrom through concentric slots or openings 43 in the said wheel 5, so that when the said wheel 5 has made part of a rotation the ends of the slots 43 come into contact with the studs 42 on the cam 41, and the said cam is thereby carried round with the wheel, causing the end of the said cam to press on a projection 44 on the releasing-lever 13, so as to operate the sector 19 and disengage from the teeth of the ratchet-wheel 27 the detent 26, which locks the index-finger until the end of the cam 41 leaves the projection 44, whereupon under the action of a spring 22 the sector 19 is turned in the reverse direction and the detent 26 is caused to again engage the said ratchet-wheel 27 and stop the index-finger until the cam 41 is moved by the wheel 5, through which the studs pass so as to again act on the projection 44 on the releasing-lever 13 and start the index-finger, as hereinbefore described.

Having now particularly described and ascertained the nature of my said invention and in what manner the same is to be performed, I declare that what I claim is—

1. In speed-indicating apparatus, the combination with continuously-acting clockwork, of a shaft having a toothed wheel and adapted to be rotated from a rotating part of the apparatus the speed of which is to be ascertained, a wheel geared to said toothed wheel and another wheel in frictional contact with said second wheel, a pinion gearing with said other wheel, an indicator-pointer carried thereby, a ratchet-wheel integral with the said pinion, a detent engaging the said ratchet-wheel to prevent the indicator being rotated, a spring-operated toothed sector carrying the said detent, an arbor rotated by the clockwork, a toothed wheel loosely mounted thereon and gearing with said toothed sector, a ratchet-wheel fast on said arbor, spring-pawls carried by said loosely-mounted wheel and gearing with said ratchet-wheel, a pivoted lever adapted to actuate against its spring, the spring-actuated detent which locks the ratchet and pinion wheels controlling the movement of the indicator-pointer and means to actuate said lever.

2. In speed-indicating apparatus, the combination with continously-acting clockwork of a shaft having toothed wheel and adapted to be rotated from a rotating part of the apparatus, the speed of which is to be ascertained, a wheel geared to said toothed wheel and another wheel in frictional contact with said second wheel, a pinion gearing with said other wheel, an indicator-pointer carried thereby, a ratchet-wheel integral with the said pinion, a detent engaging the said ratchet-wheel to prevent the indicator being rotated, a spring-operated toothed sector carrying the said detent, an arbor rotated by the clockwork, a toothed wheel loosely mounted thereon and gearing with said toothed sector, a ratchet-wheel fast on said arbor, spring-pawls carried by said loosely-mounted wheel and gearing with said ratchet-wheel, a pivoted lever adapted to actuate against its spring, the spring-actuated sector and detent which locks the ratchet and pinion wheels controlling the movement of the indicator-pointer, means to actuate said lever and means to return the indicator-pointer to its starting-point.

3. In speed-indicating apparatus, the combination with continuously-acting clockwork, of an indicator, means for conveying thereto motion from the body, the speed of which is to be indicated, a ratchet-wheel fast to the axis of said indicator, a pivoted toothed sector provided with a detent adapted to engage said ratchet-wheel, a spring tending to bring the said sector into a position in which the said detent engages the said ratchet-wheel, an arbor rotated by the clockwork, a toothed wheel mounted thereon, gearing with said sector and adapted to be turned in one direction independently of the clockwork, means to prevent its rotation in the other direction faster than the clockwork, and means to rotate said sector until its detent is out of engagement with the ratchet-wheel.

4. In speed-indicating apparatus, the combination with continuously-acting clockwork, of an indicator, means for transmitting thereto motion from a rotary part of the apparatus the speed of which is to be ascertained, a detent, lever means for removing said detent, together with a spring-actuated toothed sector carrying said detent, an arbor rotated by the clockwork, a toothed wheel loosely mounted on said arbor, and gearing with said sector, a ratchet-wheel fast upon said arbor, spring-pawls carried by said loose wheel and adapted to engage the teeth of said ratchet-wheel, said teeth and pawls being arranged to permit the rotation of said loose wheel independent of the said ratchet-wheel on the movement of the sector to disengage the detent, but to oppose its rotation in the opposite direction at a speed faster than that of the ratchet-wheel.

5. In speed-indicating apparatus, the combination with continuously-acting clockwork of a revoluble indicator, a detent, means for removing said detent for a predetermined length of time, and means for transmitting to the indicator motion from a rotating part of the apparatus, the speed of which is to be ascertained, said means consisting in a toothed wheel rotated by the apparatus last mentioned, a wheel gearing therewith, a toothed wheel in frictional contact with the latter and a toothed wheel revolving with the indicator and gearing with the wheel adapted to be revolved by frictional contact.

6. In speed-indicating apparatus, the combination with continuously-acting clockwork, of an indicator, a detent, lever means for removing said detent for a predetermined length of time, and means for transmitting to the indicator motion from a rotating part of the apparatus the speed of which is to be ascertained.

In testimony whereof I have signed this specification in the presence of two subscribing witnesses.

THOMAS WASS FLORY.

Witnesses:
 GILBERT DAVENPORT,
 H. D. JAMESON.